(12) United States Patent
Chan et al.

(10) Patent No.: US 6,484,025 B1
(45) Date of Patent: Nov. 19, 2002

(54) METHOD AND APPARATUS FOR ESTABLISHING COMPATIBILITY BETWEEN CORDLESS TELEPHONE APPLICATIONS AND PHYSICAL HARDWARE OF THE CORDLESS TELEPHONE

(75) Inventors: Virginia M. Chan, Fountain Valley, CA (US); Desmond T. O'Donnell, Aliso Viejo, CA (US); Venkateswarlu Munukutla, Irvine, CA (US); Zhiming Huang, Laguna Hills, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/479,127

(22) Filed: Jan. 7, 2000

(51) Int. Cl.⁷ .................................................. H04M 3/00
(52) U.S. Cl. ........................................ 455/418; 455/462
(58) Field of Search ................................. 455/418, 419, 455/420, 422, 426, 462, 463, 550, 575

(56) References Cited

U.S. PATENT DOCUMENTS

| | | | | |
|---|---|---|---|---|
| 5,799,067 A | * | 8/1998 | Kikinis et al. | 455/422 |
| 5,842,138 A | * | 11/1998 | Lu et al. | 455/560 |
| 6,167,255 A | * | 12/2000 | Kennedy, III et al. | 455/414 |
| 2001/0034227 A1 | * | 10/2001 | Subramanian et al. | 455/419 |
| 2002/0107014 A1 | * | 8/2002 | Kosuri | 455/426 |

* cited by examiner

*Primary Examiner*—Nay Maung
(74) *Attorney, Agent, or Firm*—Welsh & Katz, Ltd.

(57) ABSTRACT

A method and apparatus are provided for exchanging information between a cordless telephone application and physical hardware of a cordless telephone system. The method includes the steps of intercepting information exchanged between the application and the physical hardware, processing the intercepted information in order to ascertain whether the exchange requires at least one API macro and translating between the at least one API macro and a telephone command to be executed by the physical hardware of the cordless telephone system.

24 Claims, 4 Drawing Sheets

METHOD AND APPARATUS FOR ESTABLISHING COMPATIBILITY BETWEEN CORDLESS TELEPHONE APPLICATIONS AND PHYSICAL HARDWARE OF THE CORDLESS TELEPHONE

FIELD OF THE INVENTION

This invention relates to an interface which enables communication to an embedded processor. More particularly, the present invention relates to a method and apparatus for enabling cordless telephone applications to utilize an Application Programming Interface ("API") in order to program cordless telephone processor functionality.

BACKGROUND OF THE INVENTION

A cordless telephone system architecture commonly includes a programmable embedded processor that controls the operation of the telephone. Programming of the embedded processor is required to enable the processor to perform telephone functions. For example, locating a misplaced cordless telephone handset often involves programming the embedded processor to establish a radio link from the base to the handset, initializing the radio link, sending data to the handset, receiving data from the handset, and releasing the radio link. Programming the processor to perform these functions can involve software code development specific to the requirements of the processor. However, there are many different embedded processors that are used in cordless telephone system architectures and the type of processor used in the telephone determines the telephone's functional aspects.

For example, consider the case of a cordless telephone system. Typically, one company manufactures the embedded processor and another company utilizes the processor to develop the cordless telephone product sold to consumers. In such a case, the company that manufactures the embedded processor may provide a cordless telephone processor with many features, such as a telephone answering device, speakerphone, multiple-line interface capability, and caller identification. All of these features may or may not be included in the cordless telephone product that is sold to the consumer.

The manufacturer of the cordless telephone product programs the cordless telephone processor to include the features that the manufacturer would like to include in the consumer's cordless telephone.

Programming the cordless telephone processor requires understanding the specific architecture of the processor and often requires the manufacturer of the cordless telephone to tailor the development process to the specific cordless telephone processor. For example, establishing a radio link from the base to the handset often involves invoking a hardware command that is defined by an identifier followed by a 16-bit data string having a number of characters. If the manufacturer of the cordless telephone decides to utilize a different cordless telephone processor, e.g. a newly, released processor with an improved RF link protocol, then the process of programming the new cordless telephone processor must necessarily be different since the cordless telephone processor's architecture has changed. For example, establishing a radio link from the base to the handset may involve invoking a hardware command that is defined by an identifier followed by a 32-bit data string having a number of characters.

The effect of changing the embedded cordless telephone processor often necessitates the manufacturer of the cordless telephone product to develop a new cordless telephone application. As a common interface, an embodiment of the present invention will facilitate new inventions and applications that expand the functionality and use of cordless telephones.

While the existing method of programming an embedded processor in a cordless telephone system is relatively satisfactory, it requires a programmer to develop cordless telephone applications specifically for a cordless telephone processor. This process is inefficient when cordless telephone processors, and thereby cordless telephones, change frequently. As a consequence, the manufacturer of a cordless telephone may waste a lot of time having to redevelop applications every few months. Accordingly, a need exists for a better method and apparatus for establishing compatibility between telephone applications and an embedded telephone processor.

SUMMARY

A method and apparatus are described for exchanging information between a cordless telephone application and physical hardware of a cordless telephone system. The method includes the steps of (1) intercepting information exchanged between the application and the physical hardware; (2) processing the intercepted information in order to ascertain whether the exchange requires at least one API macro; and (3) translating between the at least one API macro and a telephone command to be executed by the physical hardware of the cordless telephone system. The apparatus includes a task which identifies an API macro and passes the API macro to the physical hardware transparent to the cordless telephone application. Further, the apparatus reads the API macro and logically translates the API macro into a telephone command to be executed on the cordless telephone system. The apparatus operates in a bi-directional manner so that the application interface receives telephone command codes and thereafter, translates the result code into a status message readable by the application.

An embodiment of the present invention is also achieved by providing API macros whereby when a cordless telephone application wants to perform a telephone command, the application invokes an application programming interface macro. Further, the API macros remain constant regardless of changes in the physical hardware of the cordless telephone system.

BRIEF DESCRIPTION OF THE DRAWINGS

The foregoing features of the invention will be explained in greater detail and others will be made apparent from the detailed description of the preferred embodiment of the present invention which is given with reference to the several figures of the drawing, in which.

DETAILED DESCRIPTION OF A PREFERRED EMBODIMENT

A programming interface is described for enabling cordless telephone applications to communicate with physical hardware of a cordless telephone processor. In the following detailed description, numerous specific details are set forth, such as a specific configuration of the cordless telephone system. It is apparent, however, to one skilled in the art that the present invention may be practiced without incorporating this specific configuration.

The present invention need not be limited for use in connection with a cordless telephone system but may be alternatively used for any application which makes use of a wireless link and/or hardware elements similar to those required by telephone applications. Moreover, it should be noted that there exists some instances where well-known circuits, process steps and the like are not set forth in detail in order to avoid unnecessarily obscuring illustrated embodiments of the present invention. Instead, a specific example has been created for the sole purpose of illustrating the operation of the present invention, but is in no way a limitation on the scope of the present invention.

Figure 1:
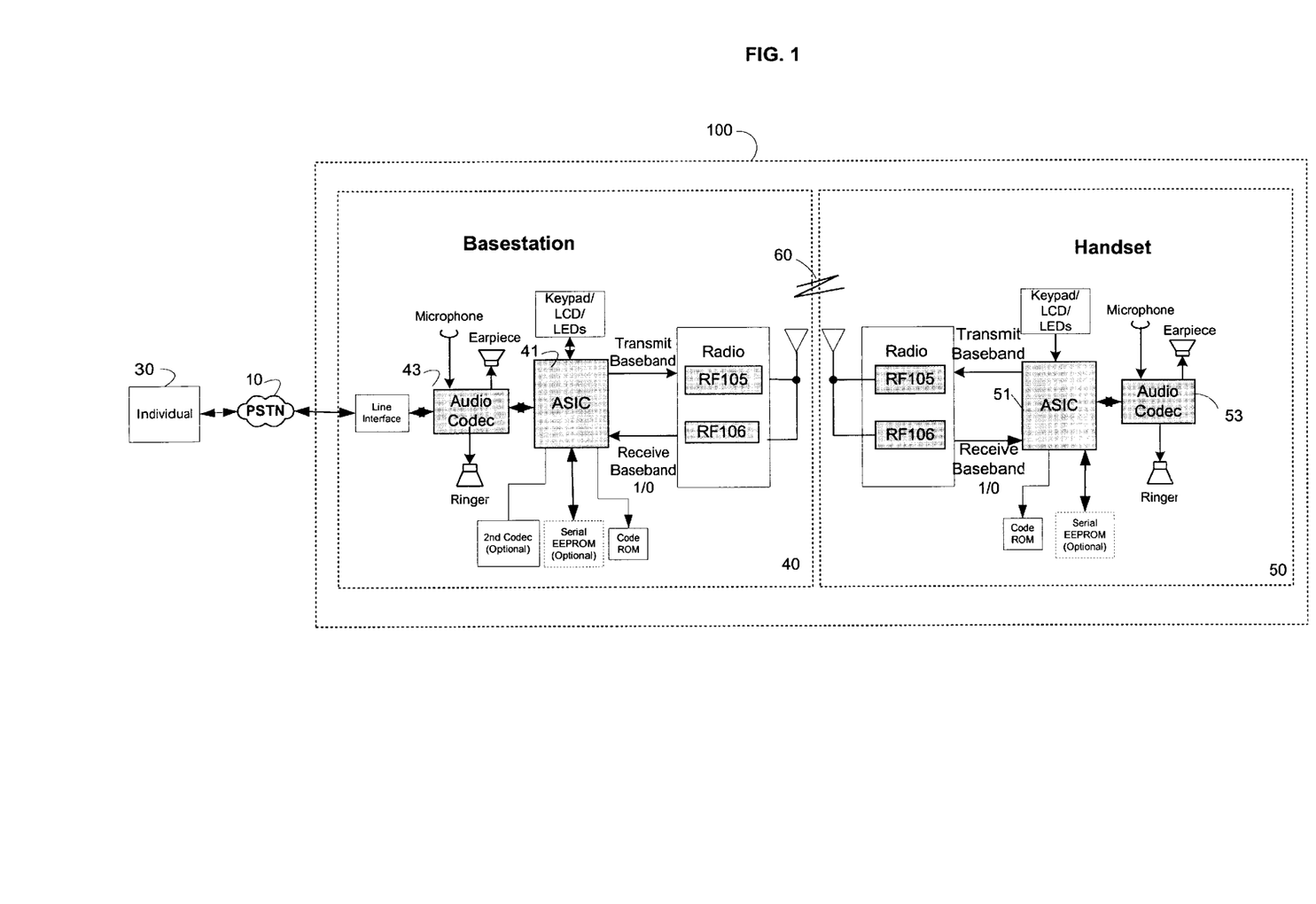
FIG. 1 is a simplified functional block diagram of an exemplary cordless telephone system under an illustrated embodiment of the invention.

Referring now to FIG. 1, the system and method of the present invention may be employed and incorporated into a cordless telephone system 100 which functions to interconnect an individual 30 calling through the public switched telephone network (PSTN) 10 to a cordless telephone user and alternatively, interconnect the cordless telephone user of the cordless telephone system 100 to an individual 30.

Components of the cordless telephone system 100 may include a caller identification (CID) component, a speakerphone, a telephone answering device (TAD), and multiple-line interface capability. Also, cordless telephone system 100 includes two audio coder/decoders ("codecs") and two application specific integrated circuits (ASICs) 41, 51. The codec converts audio signals from the PSTN 10 and microphone to and from digital samples for the audio co-processor. The ASICs 41,51 further include random access memory (RAM) and read only memory (ROM), a direct sequence DSS modem, an audio co-processor, and a controller. The DSS modem provides modulation, encoding, spreading, scrambling, transmit power control, TDD control, AGC, AFC, decoding and timing. The audio co-processor performs on-chip Caller ID, stutter dial-tone detection, adaptive differential pulse code modulation (ADPCM) modem functionality, and Dual-Tone Multi-Frequency (DTMF) and ring-tone generation. The controller performs the control and monitoring required for a DSS cordless telephone and interfaces to peripheral functions, such as keypad, light emitting diode (LED), LCD, and electrically erasable programmable read only memory (EEPROM).

It should be understood that FIG. 1 is a block diagram illustrating the basic components of a general cordless telephone system in which an embodiment of the invention can be implemented; the figure is not intended to illustrate a specific architecture for a cordless telephone system 100 and should not be interpreted as limiting the implementation of the invention to this particular architecture or application. For example, no particular bus structure is shown because various bus structures known in the field of computer design may be used to interconnect the components of the cordless telephone system 100 in a number of ways, as desired. Further, ASIC 41 or 51 may be comprised of discrete RAM, ROM, and controller or may be a single device in which these parts of the device are integrated together, such as a microprocessor. Moreover, the number and arrangement of the components of the cordless telephone system 100 may be varied from what is shown and described in ways known in the art (i.e. multiple codecs, optional erasable ROM, etc.). Many variations of cordless telephone system 100 are possible without departing from the scope of the invention. As an example of an alternative embodiment of cordless telephone system 100, FIG. 2 illustrates a cordless telephone system which combines ASIC and codec functionality into one package.

Referring back to FIG. 1, a communications scheme used to establish a communication link between the individual 30 and cordless telephone system 100 user through PSTN 10 requires the cordless telephone application 70 running on the ASICs 41, 51 of the cordless telephone system 100 to execute a specific telephone operation corresponding to an input from the individual 30 and/or the PSTN 10. For example, if the specific telephone operation is to dial a digit of a phone number from the handset 50, the cordless telephone application 70 would detect a keypress from keypad 52, interpret the key to determine that it was a digit to be dialed, send the data across the wireless link 60 to the base station 40 using the specific wireless protocol, set the appropriate gains and frequencies in the audio co-processor of the ASICs 41, 51 to mute the voice and to turn on the corresponding DTMF tone using the specific interface sequence required by the audio co-processor, set up the codec 43 on the basestation 40 to route the tone to the PSTN 10 using the specific sequence required by the codec 43, time the length of A the DTMF tone, and then lastly set the appropriate gains in the audio co-processor to turn off the DTMF tone and unmute the voice output to the PSTN 10.

The telephone function is controlled by a cordless telephone application 70 embedded in, or interfacing to, the controller of the ASIC's 41, 51. The cordless telephone application 70 performs the necessary operations to achieve the specific telephone function. In an exemplary embodiment, the cordless telephone system 100 is implemented using a digital spread spectrum chipset (e.g., developed by Conexant Systems, Inc. of Newport Beach, Calif.). For example, taking the "dialing" example as an illustration, the cordless telephone application 70 would be required to generate audible dial tones to establish a telephone connection over through the PSTN 10.

Figure 2:
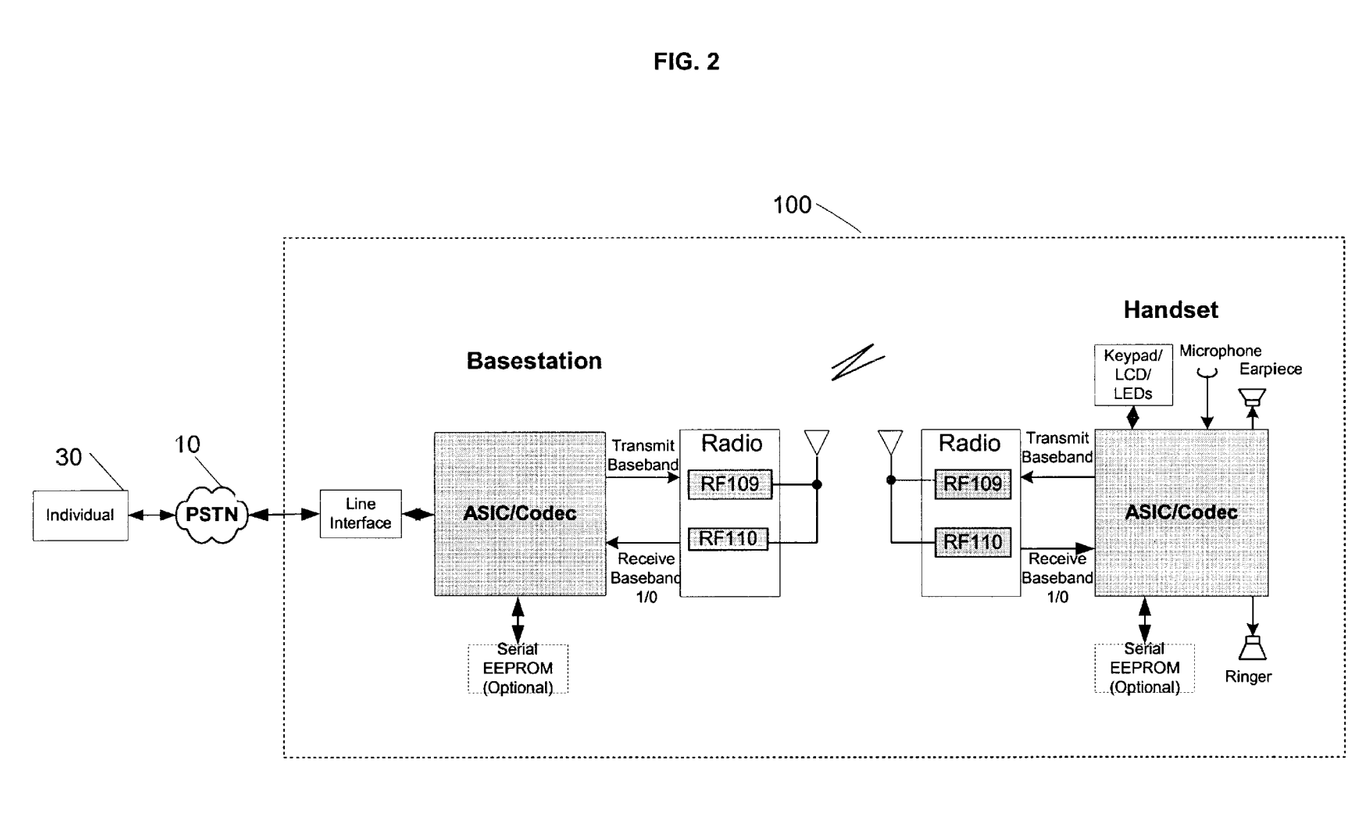
FIG. 2 is a simplified functional block diagram of an alternative cordless telephone system under another illustrated embodiment of the invention.

If, however, another cordless telephone chipset (for example as shown in FIG. 2) is used, then the cordless telephone application 70 necessary to establish a phone call would be different and thus, the operations required to perform the same command would be different. The communication scheme of the present invention is substantially different from the convention communication scheme as just described.

As previously discussed, an example application for the present invention is to enable cordless telephone applications within the ASICs 41, 51 to be compatible with the hardware of the cordless telephone system 100. When a specific cordless telephone operation is desired between the cordless telephone application 70 and the cordless telephone physical hardware, the application 70 sends a command corresponding to the telephone operation to the controller of the ASIC 41, 51.

However, contrary to the operation of the communication scheme which directly performs the specific operation, an illustrated embodiment of the present invention utilizes an application interface layer 90 to intercept the application 70 command (hereinafter referred to as a "macro") and to generate a corresponding command to be executed by the hardware interface layer or passed to the appropriate physical device. After receipt of a macro from the application 70, the API 90 logically maps the macro into corresponding hardware commands. Upon receipt of the hardware command, the hardware interface layer passes information within the macro to an associated device driver to assist the controller of ASICs 41, 51 or another hardware device to perform the specific telephone operation.

Figure 3:
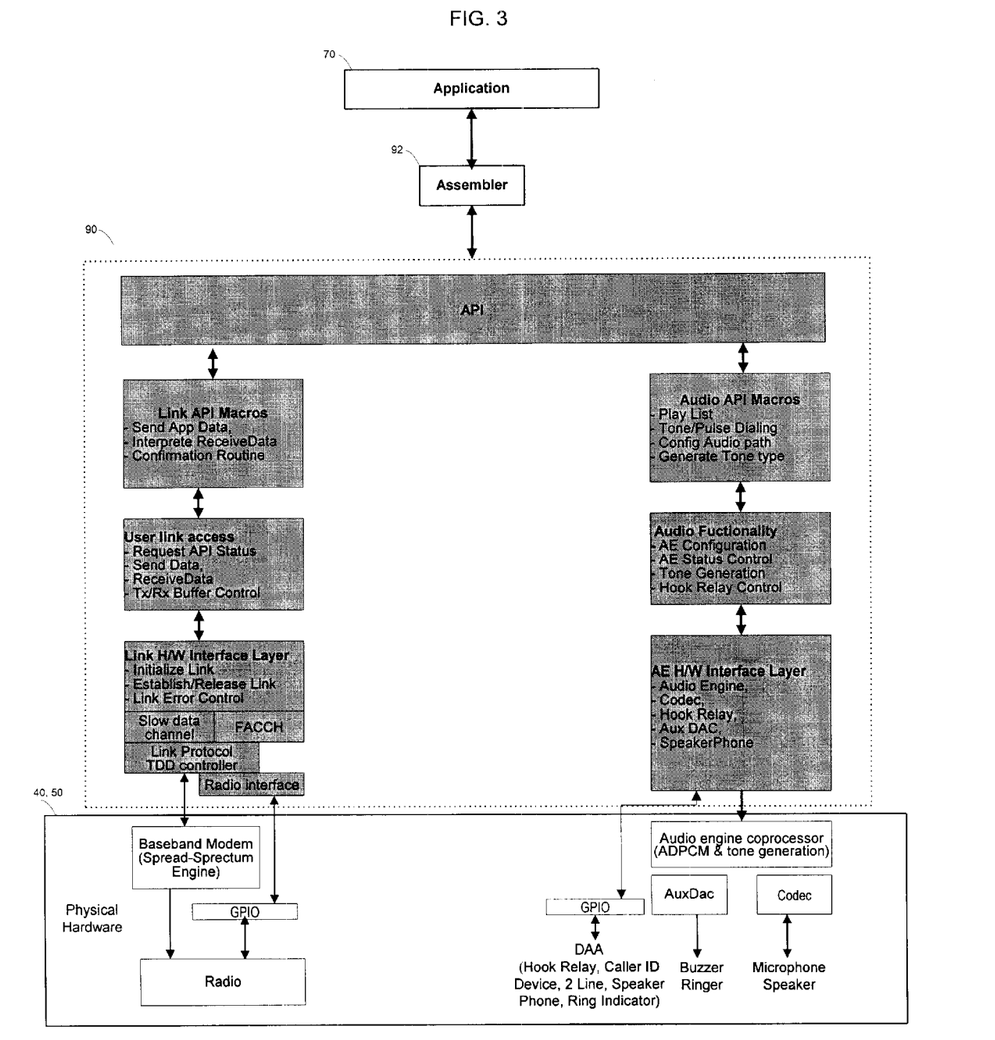
FIG. 3 is a block diagram illustrating the architecture of an embodiment of the invention in accordance with the system of FIG. 1.

In FIG. 3, a block diagram of an embodiment of the present invention is illustrated. As stated above, the application 70 sends a macro to the API 90. The API 90 is responsible for retrieving information from the application 70 and for providing such information to the hardware interface layer. The API 90 is aided by an assembler 92 which performs processing and editing information from the application 70. The API 90 with the aid of assembler 92 operates in a continuous main task loop in order to repeatedly process information in the form of a plurality of characters, being transmitted from the application 70. Concurrently, the assembler 92 monitors each character sent from the application 70 in an effort to detect the EOL character since a macro is designated as a string of characters terminated by the EOL character, such as, for example, a carriage return. If the EOL character is detected, the character string is potentially an API macro. The assembler 92 then operating as a macro processor or macro translator does the necessary lexicologic analysis needed to ascertain the nature of the macro. Once the nature of the API macro has been determined, the API 90 converts the API macro into commands that may be processed by the hardware 40, 50. The API 90 also monitors the hardware 40, 50 for messages and, thereafter, sends the response to the application 70. The response to the application 70 may also be in the form of an API macro.

In an embodiment of the invention, the API macros can be divided into two categories of functions: (1) link macros, and (2) audio macros. Link macros provide a channel for application 70 communication between the cordless telephone base 40 and handset 50. Data that crosses this channel includes telephone state negotiation, dialed digits, miscellaneous keypresses, key pressed vs. released status, ASCII data and commands for LCD display and caller ID, data read from or written to non volatile memory, success or failure indications, and remote audio effects. The application 70 receives confirmation of transmission of the data requested, plus notification of the state of the channel.

Table 1 illustrates logical mapping between the API macros inputted into the link API command task and the functionality performed at the physical layer 40, 50 by the cordless telephone system. The number of link API commands employed is a designer's choice, and therefore should not be construed as a limitation to the scope of the invention.

TABLE 1

Link API Macros accessible to the Application

| Link API Macro | Description |
| --- | --- |
| ALLOCATE_RX_BUFFER | Allocate a receive buffer with a specified depth |
| ESTABLISH_LINK | Check link status and establish link between handset and base |
| INITIALIZE_LINK | Call at power-on reset to initialize link variables, link status bytes, and protocol |
| READ_SYSTEM_PARAMETERS | Copy system parameters in the |

TABLE 1-continued

Link API Macros accessible to the Application

| Link API Macro | Description |
| --- | --- |
| | ASIC into global memory |
| RELEASE_LINK | Shut down the transmit data link |
| REQUEST_LINK_STATUS | Update the link status memory and retrieve most recent link status information |
| RESET_DATA_TRANSMIT | Manually reset the repeat request variables and flush outgoing data |
| RESET_LINK | Put link into error recovery state and force the system to scan channels until a link is re-established |
| SEND_DATA | Send a message across the link |
| SET_LS_NOTIFY_SERVICE_ADDRESS | Set up the address of the callback procedure LINK_STATUS_NOTIFY |
| SET_RECEIVE_SERVICE_ADDRESS | Set up the address of the callback procedure INTERPRET_DATA |
| WRITE_SYSTEM_PARAMETERS | Initialize system parameters in the ASIC registers |
| CONFIRM | Report success or failure of the SEND_DATA macro |
| INTERPRET_DATA | Notify application that a message has been received |
| LINK_STATUS_NOTIFY | Update link status and perform status changes |

Audio macros distance the application 70 from (i.e. provide an interface between) the specifics of the codec and the audio co-processor. The API 90 sits atop driver modules which interact directly with the physical hardware. Typical audio macros perform beep/alert tone generation, ring generation, DTMF tone generation, audio path control, codec configuration, hook relay interface, and pulse dialing.

Table 2 illustrates logical mapping between the API macros inputted into the audio API command task and the functionality performed at the physical layer by the cordless telephone processor. The number of audio API commands employed is a designer's choice, and therefore should not be construed as a limitation to the scope of the invention.

TABLE 2

Audio API Macros accessible to the Application

| Audio API Macro | Description |
| --- | --- |
| AUDIODRIVERSTATUS | Update global status fields of AUDIO_DRIVER_STATUS register |
| CONFIGAE | Perform configuration of AE gain registers |
| CONFIGCODEC | Perform configuration of codec |
| DELAY | Initialize time delay counters |
| DISABLEAUXDAC | Disable auxiliary DAC by putting the DAC into sleep mode |
| DISABLESPEAKERPH | Disable speakerphone for specified line |
| ENABLEAUXDAC | Enable the auxiliary DAC |
| ENABLECDCSAMPLES | Pass audio samples to codec |
| ENABLESPEAKERPH | Enable speakerphone for specified line |
| MUTESPEAKERPH | Mute speakerphone for specified line |
| OFFHOOK | Set hook relay for specified line to go off-hook |
| ONHOOK | Set hook relay for specified |

TABLE 2-continued

Audio API Macros accessible to the Application

| Audio API Macro | Description |
| --- | --- |
| | line to go on-hook |
| READAEPARAM | Read AE register values |
| READCDCREG | Read codec register values |
| READDELAYVALUE | Read current counter value in specified timer |
| RESETAE | Initialize gains and certain AE registers |
| RESETCODEC | Initialize codec |
| SLEEPAE | Places AE into sleep mode |
| SLEEPCODEC | Places codec into sleep mode |
| STARTTONE | Initiate audio alert or DTMF tone |
| STOPTONE | End audio alert or DTMF tone begun by STARTTONE |
| TRANSFERVALUE | Copy memory from source to destination |
| UNMUTESPEAKERPH | Unmute speakerphone for specified line |
| WRITEAEPARAM | Add to FIFO queue to enable a write to memory space of AE |
| WRITECDCREG | Add to FIFO queue to enable a write to memory space of codec |
| WRITETOAUXDAC | Write to auxiliary DAC |
| ZEROCDCSAMPLES | Send zero data samples to codec |

The operation of the various illustrated embodiments of the present invention may best be understood by continuing the "dialing" example previously described. As previously mentioned herein, this specific example lends itself to explaining the operation of an embodiment of the present invention and in no way should be construed as a limitation on the scope of the invention.

The example will focus on a desired operation to dial a local phone number (e.g. 555-1212) in order to connect cordless telephone system 100 to an individual 30 through the PSTN 10. First, the application 70 would place the cordless phone off-hook. This requires execution of the audio API macro, OFFHOOK to place a specified line to go off-hook. The audio API in turn calls the hook relay driver to physically control the hook relay. Second, the application 70 calls CONFIGAE to control the ADPCM gains, enable the volume, and generate a tone. Third, the application 70 calls CONFIGCODEC to enable the codec to accept PSTN 10 input and output, attenuate the line, control the tone and volume through the DAC, and enable the microphone. Fourth, a data link is established for sending the telephone number by calling ESTABLISH_LINK. Fifth, the telephone number is sent across the data link to the PSTN 10 when the application 70 calls SEND_DATA with the telephone number. Finally, CONFIRM is sent from the API 90 to the application 70 (e.g. in the form of another API macro) to report the success or failure of the data transmission initiated by SEND_DATA.

The above example differs from the operation of the conventional communication scheme in that the audio and link API macros used will not vary if the cordless telephone processor is changed. For example, regardless of whether the hardware of the cordless telephone system 100 is as depicted in FIG. 1 or in FIG. 2, the API macros and the process to establish a phone call is the same.

Although only audio and link API macros have been described in detail, more API macros may be implemented in the API 90. For example, an API 90 within the scope of the invention may include macros for controlling and/or accessing cordless telephone batteries, switches, LCDs, LEDs, and keypads in cordless telephone system 100.

Figure 4:
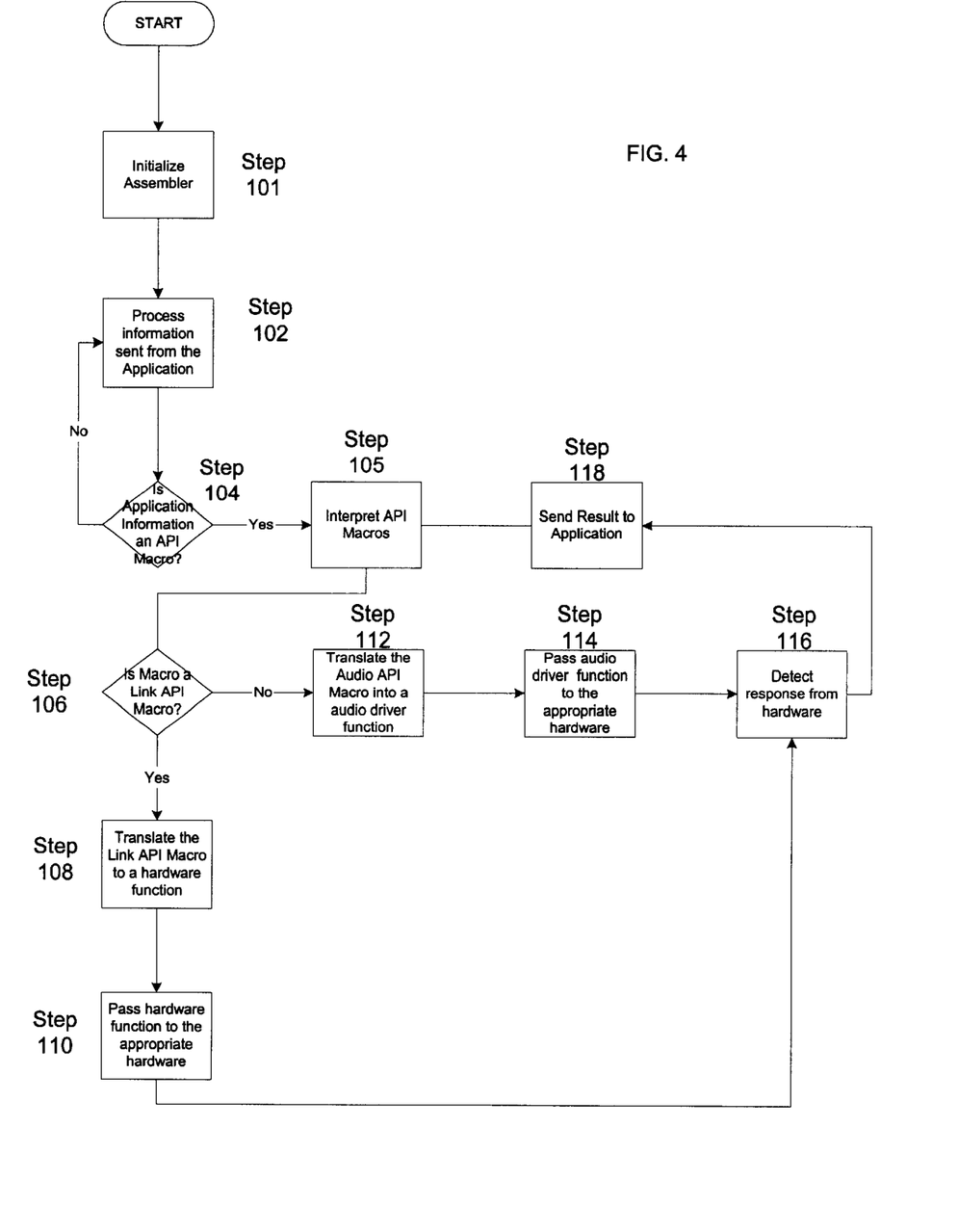
FIG. 4 is a flowchart of the execution process by an embodiment of the invention in accordance with the architecture of FIG. 3.

The following is a detailed description of the operations of the API 90 which is shown in FIG. 4. In step 101, the API 90 is initialized so as to begin accepting information from the application 70. A part of the initialization requires the API 90 to initialize the assembler 92 so that lexicologic analysis of the information that is sent from the application 70 could take place. In step 102, the API 90 with aid of the assembler 92 retrieves information from the application 70 and stores the information in a plurality of buffers. However, it is contemplated that the API 90 could be designed to retrieve information upon receipt of an interrupt signal or periodically after a preselected time period. Further, step 102 includes processing the information retrieved from the application 70 in search of the EOL character. If the assembler 92 detects an EOL character during such processing, the API 90 continues processing the information (potentially having an API macro).

In step 104, the assembler 92 parses the information to determine if an API macro has been received and if so, passes the macro to the API 90 (step 106). If an API macro has not been received, the assembler returns to step 102 to continue receiving information from the application 70. At step 105, the API 90 interprets the macro sent from the assembler 92 and stores the macro in a plurality of buffers. Although in an exemplary embodiment of the API 90 maintains sequential transmission and interpretation of API macros from the application 70, it is contemplated that the API 90 could be designed to implement a priority based scheme where certain API macros are given higher priority over other API macros. At step 106, the API 90 determines whether the macro is a link API macro. If the macro is a link API macro, then processing continues to step 108. Otherwise, the API 90 is assumed to be an audio API macro and processing continues at step 112.

In step 108, the API 90 translates the link API macro to the DSS modem interface for further delivery. Although in an exemplary embodiment the API 90 maintains sequential transmission and interpretation of link macros from the application 70, it is contemplated that the API 90 could be designed to implement a priority based scheme where certain link API macros are given higher priority over other API macros. In such an implementation, higher priority link macros would preempt lower priority macros. In step 110, the DSS modem performs the command specified by the link API.

In step 112, the API 90 determines the type of audio API macro and translates the audio API macro to the appropriate audio hardware driver. For example, the audio API macro, ENABLESPEAKERPH, requires the API 90 to translate the API macro to the codec driver as a codec task. In step 114, the appropriate audio hardware driver performs the command specified by the audio API macro.

After completion of steps 110 and 114, at step 116, the API 90 polls the hardware for a response. The API 90 waits for a result code message in response to the hardware function calls, i.e. the results of the executed commands at the hardware level 40, 50 are passed up from the physical layer to the hardware drivers and then in turn to the API 90. At step 118, the API 90 returns the success or failure of the executed API macros to the application 70. Thereafter, processing returns to step 105 and the API 90 waits for the application 70 to invoke another API macro.

A specific embodiment of a method and apparatus of software support according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A method for exchanging information between a cordless telephone application and physical hardware of a cordless telephone system, the method comprising the steps of:
    intercepting information exchanged between the application and the physical hardware;
    processing the intercepted information in order to ascertain whether the exchange requires at least one API macro; and
    translating between the at least one API macro and a telephone command to be executed by the physical hardware of the cordless telephone system.

2. The method of claim 1, wherein the step of intercepting information further includes the steps of
    retrieving the intercepted information transmitted from the application; and
    storing the intercepted information within a first storage buffer.

3. The method of claim 2, wherein the retrieving step further includes the step of checking whether there exists information within the first storage buffer after a preselected period of time.

4. The method of claim 2, wherein the step of retrieving the intercepted information further includes the steps of
    copying the intercepted information from the first storage buffer into a second storage buffer; and
    scanning the intercepted information for a predetermined character.

5. The method of claim 1, wherein the step of processing the intercepted information further includes the step of determining whether the intercepted information contains an API macro and identifying the API macro to determine the type of the API macro.

6. The method of claim 5, wherein the type of API macro may include those to operate an RF link, audio hardware, keypad, light emitting diodes, liquid crystal display, battery, serial port, volatile and nonvolatile memory, and switches.

7. The method of claim 6, wherein audio hardware includes a codec, dac, hook relay, at least one telephone line, caller identification device, speakerphone, ring indicator, ringer, and microphone.

8. The method of claim 1, wherein the step of translating further includes the steps of:
    translating the API macro into a corresponding hardware driver command; and
    transmitting the corresponding hardware driver command to a specific hardware driver to perform the specific telephone operation.

9. The method of claim 8 wherein the API macro includes audio interface macros and link interface macros.

10. The method of claim 8 wherein the API macro includes information necessary to perform the specific telephone operation.

11. The method of claim 8 wherein the API macro includes an API macro being one from a plurality of API macros including ALLOCATE_RX_BUFFER, ESTABLISH_LINK, INITIALIZE_LINK, READ_SYSTEM_PARAMETERS, RELEASE_LINK, REQUEST_LINK_STATUS, RESET_DATA_TRANSMIT, RESET_LINK, SEND_DATA, SET_LS_NOTIFY_SERVICE_ADDRESS, SET_RECEIVE_SERVICE_ADDRESS, WRITE_SYSTEM$_{13}$ PARAMETERS, CONFIRM, INTERPRET_DATA, LINK_STATUS_NOTIFY, AUDIODRIVERSTATUS, CONFIGAE, CONFIGCODEC, DELAY, DISABLEAUXDAC, DISABLESPEAKERPH, ENABLEAUXDAC, ENABLECDCSAMPLES, ENABLESPEAKERPH, MUTESPEAKERPH, OFFHOOK, ONHOOK, READAEPARAM, READCDCREG, READDELAYVALUE, RESETAE, RESETCODEC, SLEEPAE, SLEEPCODEC, STARTTONE, STOPTONE, TRANSFERVALUE, UNMUTESPEAKERPH, WRITEAEPARAM, WRITECDCREG, WRITETOAUXDAC, ZEROCDCSAMPLES.

12. The method of claim 1 further including the step of polling for a result message from the executed telephone. command.

13. The method of claim 12, wherein after the polling step, the method further comprises the steps of:
    receiving the result code from a hardware device driver;
    translating the result code into a status message corresponding to the result code; and
    transferring the status message to the application.

14. In a cordless telephone system employing an Application Programming Interface and executing a cordless telephone application producing a API macro representing specific telephone operations, a method comprising the steps of:
    initializing the application programming interface so that the cordless telephone is able to receive the API macro;
    intercepting information transmitted from the application to a hardware device of the cordless telephone system;
    processing the intercepted information in order to ascertain whether the information includes the API macro;
    translating the API macro into a telephone command to be executed by the corresponding hardware device of the cordless telephone system; and
    polling the hardware device for a result code of the executed telephone command.

15. The method of claim 14, wherein the API macro representing telephone commands remains independent of the cordless telephone system.

16. A communication interface for allowing physical hardware of a cordless telephone to become compatible with an application of the cordless telephone through an Application Programming Interface, the communication interface comprising:
    first means for receiving a API macro from the application and for interpreting it into a series of commands corresponding to the API macro; and
    second means for receiving the series of commands from the first means and for executing a corresponding function on a cordless telephone system.

17. The communications interface of claim 16, wherein the first means includes a programmed embedded processor and an application specific integrated circuit of a cordless telephone system.

18. The communications interface of claim 16, wherein the second means includes a programmed embedded processor and an application specific integrated circuit of a cordless telephone system.

19. The communications interface of claim 16, wherein the API macro includes specified command identifiers followed by data required to perform a specific telephone operation.

20. The communications interface of claim 16, further comprising
   third means for storing information including the received API macro; and
   fourth means coupled to the first and third means for processing information transmitted from the first means to determine whether the API macro is within the information.

21. A communication interface for enabling a communication application, being executed on a cordless telephone system and generating a API macro to become compatible with an Application Programming Interface, the communication interface comprising:
   a device that is capable of sending and retrieving information of the cordless telephone system;
   a first task that is capable of processing information received from the application to determine whether the API macro is within the information; and
   a second task that is capable of the specific telephone command represented by the API macro.

22. The communication interface of claim 21 wherein the device is a hardware driver interface.

23. The communication interface of claim 21 wherein the first and second tasks are software functions of a communication interface.

24. A method for exchanging information between a telephone application and associated physical hardware including an embedded processor of a wireless telephone system, the method comprising the steps of:
   intercepting information exchanged between the application and the physical hardware;
   processing the intercepted information in order to ascertain whether the exchange requires at least one API macro; and
   translating between the at least one API macro and a telephone command to be executed by the physical hardware of the wireless telephone system.

* * * * *